United States Patent
Dubash et al.

(10) Patent No.: US 7,035,613 B2
(45) Date of Patent: *Apr. 25, 2006

(54) L1/L2 GPS RECEIVER

(75) Inventors: Noshir B. Dubash, San Pedro, CA (US); Robert Tso, So. San Gabriel, CA (US)

(73) Assignee: SiRF Technology, Inc., San Jose, CA (US)

( * ) Notice: Subject to any disclaimer, the term of this patent is extended or adjusted under 35 U.S.C. 154(b) by 203 days.

This patent is subject to a terminal disclaimer.

(21) Appl. No.: 10/715,656

(22) Filed: Nov. 18, 2003

(65) Prior Publication Data

US 2004/0097211 A1 May 20, 2004

Related U.S. Application Data

(63) Continuation of application No. 09/732,956, filed on Dec. 7, 2000, now Pat. No. 6,675,003.

(51) Int. Cl.
*H04B 1/10* (2006.01)
(52) U.S. Cl. .................. 455/302; 455/324; 342/357.12
(58) Field of Classification Search ............. 455/456.1, 455/456.6, 295–296, 302, 313, 318, 323–324; 342/357.06, 357.12
See application file for complete search history.

(56) References Cited

U.S. PATENT DOCUMENTS

| 5,108,334 | A | | 4/1992 | Eschenbach et al. |
| 5,678,169 | A | | 10/1997 | Turney |
| 5,852,784 | A | * | 12/1998 | Ito et al. .................. 455/552.1 |
| 6,675,003 | B1 | * | 1/2004 | Dubash et al. .............. 455/302 |

* cited by examiner

*Primary Examiner*—Nguyen T. Vo
(74) *Attorney, Agent, or Firm*—Edward C. Kwok; MacPherson Kwok Chen & Heid LLP

(57) ABSTRACT

In a system and method for simultaneously receiving or switching between dual frequency carrier signals in a GPS receiver, the GPS receiver is adapted to utilize different harmonics of a sub-harmonic frequency generator, which may include a lower frequency voltage controlled oscillator (VCO) to detect the L1 and L2 GPS carriers. A sub-harmonic mixer may be used to simultaneously down convert the L1 and L2 signals to a lower intermediate frequency (IF). A second mixer may be an image reject (IR) mixer used to separate the downconverted L1 and L2 signals. This mixer may be configured to simultaneously monitor the L1 and L2 signals, or to switch between the L1 and L2 signals. High frequency switching is not required of the radio frequency (RF) input or local oscillator signals, and simultaneous L1 and L2 reception is enabled without a 3 dB image noise degradation. This system and method minimizes the RF components and power dissipation in a dual frequency GPS receiver, while optimizing the functionality and performance.

13 Claims, 1 Drawing Sheet

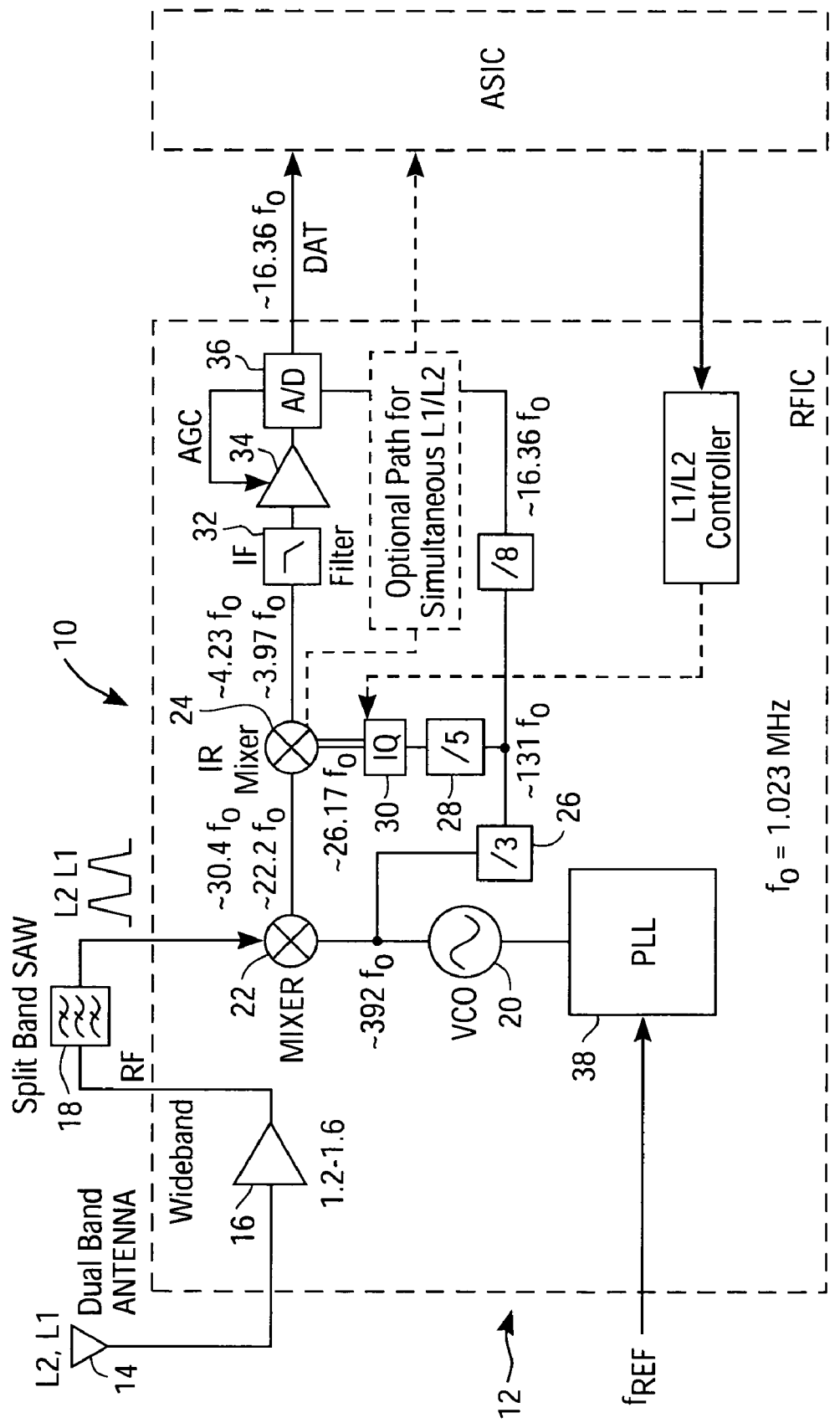

L1/L2 GPS RECEIVER

This application is a continuation of application Ser. No. 09/732,956, filed Dec. 7, 2000, now U.S. Pat. No. 6,675,003 which is hereby incorporated by reference in its entirety.

BACKGROUND OF THE INVENTION

1. Field of the Invention

The invention relates generally to radio frequency receivers, and more specifically to multiple band global positioning system (GPS) receivers used for navigation.

2. Description of the Related Art

GPS satellites transmit data at two radio frequency (RF) system carrier frequencies: 1575.42 MHz (L1) and 1227.6 MHz (L2). GPS data from both carriers can be used to increase the position accuracy, and to provide carrier selectivity in case of interference or jamming of one of the carriers.

A GPS receiver designed to receive the L1 and/or L2 carriers requires a method for receiving both signals simultaneously or efficiently switching between the signals. One solution is to duplicate all receiver parts and functions for the L1 and L2 bands. However, for low-power portable receivers, it is desirable to integrate the L1 and L2 functions as much as possible, to minimize the number of RF functions and power dissipation.

It has been known for L1/L2 receivers to use parallel RF paths and/or RF switching of the input and/or local oscillator (LO) signals. For example, U.S. Pat. No. 5,883,597 discloses an L1/L2 GPS receiver in which the LO is switched between three frequencies to select "L1 only," "L2 only" or "L1 and L2." However, this requires the LO to be tunable over a very wide frequency range of about 696 MHz, from approximately 1054 MHz to 1750 MHz, which makes on-chip integration difficult. Further, due to practical design limitations, this may require switching between two or three tuned oscillators, which may result in excessive power consumption for multiple voltage controlled oscillators (VCOs). Also, in the "L1 and L2" mode, this receiver may suffer a 3 dB noise penalty due to image noise. Switching of the LO signal may also require resynchronization of tracking loops, which reduces receiver response time for time sensitive applications.

U.S. Pat. No. 5,678,169, for example, discloses an L1/L2 receiver in which the VCO and LO frequency is fixed exactly halfway between the L1 and L2 carriers, as in the "L1 and L2" mode of the above referred-to receiver. This receiver uses switched L1 and L2 filters which eliminate the problem of the 3 dB image noise. However, this receiver may not be capable of true simultaneous L1 and L2 detection, since the L1/L2 selection is done by RF switches before the mixer.

U.S. Pat. Nos. 5,040,240 and 5,736,961, for example, disclose L1/L2 receivers which use parallel RF paths for the downconversion. U.S. Pat. No. 5,040,240 uses a common VCO with a series of different dividers and multipliers for the L1 and L2 downconversions. However, due to the duplication of RF functions, these methods are not optimum for high integration and low-power.

Therefore, those concerned with the development and use of improved dual frequency carrier signal receiver systems and methods have recognized the need for improved systems and methods for enabling simultaneous dual frequency capabilities without requiring radio frequency switches or local oscillator switching.

Accordingly, the present invention fulfills these needs by providing efficient and effective systems and methods for simultaneously receiving or switching between dual frequency carrier signals in a highly integrated, low power receiver.

SUMMARY OF THE INVENTION

Briefly, and in general terms, the present invention provides a system and method for simultaneously receiving or switching between dual frequency carrier signals.

By way of example, and not by way of limitation, the present invention provides a new and improved system for simultaneously receiving or switching dual frequency carrier signals, without local oscillator switching or radio frequency switches.

More particularly, the present invention includes a subharmonic frequency generator, which may include a subharmonic VCO, with different harmonics of the sub-harmonic frequency VCO providing the local oscillator signals for the L1 and L2 carriers. Downconversion in the subharmonic frequency generator or a first mixer then produces two intermediate frequencies (IF) for the L1 and L2 carriers. The VCO frequency and harmonic orders may be chosen such that the difference between these two IF signals is twice the desired final IF. The final IF may be obtained through a second mix in a second mixer with an LO signal that is halfway between the L1 and L2 IF frequencies. Since these IF signals generated in the first mixer are on either side of the LO frequency they can be separated by having the second mixer be an image reject mixer. The image reject mixer can be used to receive L1 and L2 simultaneously using both its outputs, or to switch between L1 and L2. The selection is accomplished by interchanging the "I" and "Q" LO input signals of the second IR mixer. Since this switching is done at a lower IF frequency it does not cause unlocking of the phase locked loop (PLL) or the receiver tracking loop.

This receiver architecture is chosen to minimize power dissipation, while optimizing integration and performance. Operation of an on-chip integrated VCO at a frequency three to four times lower than the L1/L2 RF carriers saves power in the VCO and PLL. Switching at the IF frequency consumes less power compared to RF or LO switching, and does not degrade the receiver noise figure. RF switches introduce front-end loss which degrades the receiver noise figure. Only one external split band filter is required at the front end to reject the first image frequencies for the L1 and L2 downconversion. The second image is rejected by the image reject function of the second mixer. There is no 3 dB degradation for simultaneous L1/L2 herein.

A single fixed frequency VCO eliminates the need of LO switching, and eliminates the need of RF switches, while still providing simultaneous L1 and L2 capability.

Although the preferred embodiment described is an L1/L2 GPS receiver, the systems and methods described herein can be used for any dual frequency RF receiver.

The above and other objects and advantages of the invention will become apparent from the following more detailed description, when taken in conjunction with the accompanying drawing of an illustrative embodiment.

BRIEF DESCRIPTION OF THE DRAWINGS

The FIGURE is a circuit diagram of a dual frequency carrier signal receiver, in accordance with an embodiment of the invention.

DETAILED DESCRIPTION OF THE PREFERRED EMBODIMENTS

The present invention is directed to an improved system and method for simultaneously receiving or switching dual frequency carrier signals. The improved system and method provides efficient and effective simultaneous receiving or switching, without radio frequency switches or local oscillator switching. The preferred embodiments of the improved system and method are illustrated and described herein by way of example only and not by way of limitation.

Referring now to the FIGURE, which illustrates a system 10 for simultaneously receiving or switching between dual frequency carrier signals, comprising a receiver 12 which is preferably a GPS receiver for the L1 and L2 carriers. The front-end of the receiver 12 consists of a dual band antenna 14 for receiving the dual frequency carrier signals, and a wide band low noise amplifier (LNA) 16, with 1.2 GHz to 1.6 GHz bandwidth, for amplifying the L1 and L2 carriers. A split band surface acoustic wave (SAW) filter 18 is then used to pass the L1 and L2 bands and reject other frequencies. The out-of-band rejection of this filter 18 is adapted to be high enough to sufficiently attenuate the first image frequencies, as set forth below.

The system 10 further includes a sub-harmonic frequency generator, for generating a sub-harmonic frequency so as to enable harmonics of the sub-harmonic frequency to generate local oscillator frequency signals for the dual frequency carrier signals, and for mixing the dual frequency carrier signals with the local oscillator frequency signals, to generate distinct intermediate frequency signals for each dual frequency carrier signal. The sub-harmonic frequency generator may comprise a voltage controlled oscillator (VCO) 20, for generating the sub-harmonic frequency, and a first mixer 22, which may comprise a sub-sampling mixer for mixing the dual frequency carrier signals with the local oscillator frequency signals. The sub-harmonic frequency generator alternatively may comprise a sub-harmonic mixer, for generating the sub-harmonic frequency, and for mixing the dual frequency carrier signals with the local oscillator frequency signals, the choice of which as an alternative to the sub-sampling mixer may depend on the frequency plan. The sub-sampling mixer 22 may be adapted to include switches comprising N-channel metal oxide semiconductor transistors. The signals from the first mixer 22 are input into a second mixer 24.

The VCO 20 comprises a sub-harmonic voltage controlled oscillator, adapted to generate a sub-harmonic frequency thereof and to enable harmonics of the sub-harmonic frequency to generate LO frequency signals for the dual frequency carrier signals. The signal from the VCO 20 is input into the first mixer 22, and is input into a divide by three divider 26 and a divide by five divider 28, from which the I and Q phases are input into an IQ select switch 30. The IQ select switch 30 selectively switches between the I and Q phases, and the I and Q phases are input into the second mixer 24. The IQ select switch 30 enables efficient selection and switching to be accomplished between the L1 and L2 signals by enabling the interchanging of the I and Q LO input signals in the second mixer 24. The second mixer 24 is an image reject (IR) mixer, which is adapted to separately receive the L1 and L2 signals, and includes a pair of outputs. It can be configured to simultaneously provide both L1 and L2 signals using both mixer outputs and dual output paths, or to switch between the L1 and L2 mixer outputs using only one output path. The selection in the second mixer 24 between the L1 and L2 signals is preferably implemented by interchanging the "I" and "Q" signals of the LO frequency signals.

The IF signals generated in the first mixer 22 are preferably on either side of an LO frequency signal, and are adapted to be separated by the second mixer 24. The second mixer 24 is further adapted to generate the final IF upon mixing with an LO frequency signal which is intermediate to the L1 and L2 IFs. The LO frequency adapted to be mixed with the L1 and L2 IFs in the second mixer 24 is approximately halfway between the L1 and L2 IFs. The final IF signal is input into a low-pass filter 32 and automatic gain control (AGC) amplifier 34 before being sampled by an analog to digital (A/D) converter 36. The frequency and the harmonics of the VCO 20 are preferably chosen such that the difference between the first IFs is approximately twice the desired final IF.

Several constraints influence the choice of a frequency plan for the receiver 12 and the frequency of the VCO 20. For low power dissipation in the VCO 20 and a PLL 38 it is desirable to have the VCO frequency as small as possible. This may increase the sub-harmonic ratio, which is the number of times the VCO signal must be multiplied in the mixer 22 before mixing with the carrier. The preferred frequency of the VCO 20 is about 401.62 MHz. The noise figure of the mixer 22 may increase with increasing sub-harmonic ratios, which may degrade receiver performance, and require more RF gain. A sub-harmonic ratio of 3 to 4 is preferred, lowering the VCO power significantly while minimizing the mixer noise. Another constraint is that the L1 and L2 IF signals after the first mixer 22 should be high enough to enable sufficient rejection of the image frequencies by the RF SAW filter 18.

If n and m are the sub-harmonic ratios for L1 and L2 respectively, and $f_{vco}$ is the VCO frequency, then the first IF frequencies for the L1 and L2 carriers are given by $f_{IF1,L1}=|nf_{VCO}-1227.6 \text{ MHz}|$, and by $f_{IF1,L2}=|mf_{VCO}-1575.42 \text{ MHz}|$. The LO frequency for the second mixer 24 is given by $f_{LO2} \cong (f_{IF1,L1}+f_{IF1,L2})/2$, and the final intermediate frequencies are given by $f_{IF2} \cong |f_{IF1,L1}-f_{IF1,L2}|/2$.

Preferably n=3 and m=4 for the sub-harmonic ratios. Using convenient integer dividers to generate the $2^{nd}$ LO and sampling frequency, the optimum frequency plan is then given by: $f_{VCO}$=401.63MHZ, $f_{IF1,L1}$=31.10 MHz, $f_{IF1,L2}$=22.71 MHZ, $f_{LO2}=f_{VCO}/15$=26.78 MHz, $f_{IF2,L1}$=4.32 MHz, $f_{IF2,L2}$=4.07 MHz and sampling frequency $f_s$=fvco/24=16.73 MHz. Oversampling by a factor of approximately four eliminates any degradation due to noise folding, and provide samples that are close to 90 degree I, Q samples which minimize processing loss. The first image frequencies for mixer 22 are 62.2 MHz and 45.4 MHz away from the L1 and L2 carriers respectively. This does not put excessive demands on the split band RF SAW filter 18, which would require a 25 MHz to 30 MHz 3-dB bandwidth for each band.

The sub-harmonic mixer 22 should have sufficient conversion gain and sufficiently low noise figure for the n=3 and m=4 sub-harmonic mixing products, to minimize impact on the receiver sensitivity. A sub-sampling integrated switched capacitor implementation of the mixer 22 is preferred for optimum performance at both the $3^{rd}$ and $4^{th}$ harmonics.

The first mixer 22 is preferably adapted to mix the third harmonic of the VCO 20 with the L2 carrier, and the fourth harmonic of the VCO 20 with the L1 carrier.

In accordance with the present invention, true simultaneous L1/L2 reception capability is provided, with the flexibility to choose simultaneous or switched operation, and without 3 dB degradation in noise figure.

In the present invention, an efficient means of switching between L1 and L2 at the IF frequency is provided by exchanging the I and Q LO signals of the $2^{nd}$ IR mixer. Lower frequency switching at the IF dissipates less power than the RF and LO switching techniques of prior switching, and also does not disturb the phase lock of the PLL and tracking loops. IF switching in the system after amplifier gain therein also eliminates the noise figure degradation caused by front-end RF switches.

Pursuant to the invention, the sub-harmonic VCO for a dual frequency GPS receiver operating at one fourth the LI frequency is adapted to save power dissipation in the VCO and PLL.

In accordance with the invention, on-chip RF functions and external components required for a high functionality GPS LI/L2 receiver are minimized. An external high-Q IF filter is not required, and the VCO can be easily be integrated on the chip.

It will be apparent from the foregoing that, while particular forms of the invention have been illustrated and described, various modifications can be made without departing from the spirit and scope of the invention. Accordingly, it is not intended that the invention be limited, except as by the appended claims.

The invention claimed is:

1. A method for generating local oscillator frequency signals for dual frequency signals, wherein the method comprises:
    generating a sub-harmonic frequency so as to enable harmonics of the sub-harmonic frequency to generate local oscillator frequency signals for the dual frequency carrier signals, and mixing the dual frequency carrier signals with the local oscillator frequency signals, to generate distinct intermediate frequency signals for each dual frequency carrier signal; and
    separating the dual frequency carrier signals, and switching between the dual frequency carrier signals, responsive to exchanging in-phase and quadrature-phase components of the local oscillator frequency signals.

2. The method of claim 1, comprising a global positioning system receiver, wherein the dual frequency carrier signals comprise L1 and L2 GPS carrier signals.

3. The method of claim 2, wherein the sub-harmonic frequency is generated to mix the third harmonic with the L2 carrier, and the fourth harmonic with the L1 carrier.

4. The method of claim 2, wherein the sub-harmonic frequency is about 401.62 MHz.

5. The method of claim 2, further comprising passing the L1 and L2 frequencies and rejecting other frequencies by using a split-band surface acoustic waver filter and a sub-harmonic frequency generator.

6. The method of claim 2, further comprising generating a final intermediate frequency wherein the difference between the distinct intermediate frequency signals is twice the final intermediate frequency.

7. The method of claim 1, wherein the sub-harmonic frequency is generated by
    a voltage controlled oscillator;
    a mixer for mixing the dual frequency carrier signals with the local oscillator frequency signals; and
    wherein generating and mixing comprises generating in the voltage controlled oscillator, and mixing in the mixer.

8. The method of claim 1, wherein mixing comprises using an integrated switched capacitor sub-sampling mixer, and wherein generating and mixing comprises generating and mixing in the integrated switched capacitor sub-sampling mixer.

9. The method of claim 8, wherein the sub-sampling mixer includes switches comprising N-channel metal oxide semiconductor transistors, and wherein mixing further comprises mixing in the N-channel metal oxide semiconductor transistor switches in the sub-sampling mixer.

10. The method of claim 1, further adapted to generate a final intermediate frequency, wherein an image reject mixer is adapted to generate the final intermediate frequency upon mixing with a local oscillator frequency signal which is between the L1 and L2 intermediate frequencies, further comprising generating a final intermediate frequency in the image reject mixer.

11. The method of claim 1, wherein the intermediate frequency signals generated in the sub-harmonic frequency generator are on either side of the local oscillator frequency signal in the image reject mixer, and are adapted to be separated by the image reject mixer, wherein generating further comprises generating the intermediate frequency signals on either side of the local oscillator frequency signal of the image reject mixer, and separating the intermediate frequency signals in the image reject mixer.

12. The method of claim 1, wherein the image reject mixer includes a plurality of outlets adapted to be connected therein, and is adapted to receive the dual frequency carrier signals simultaneously through the plurality of outputs, further comprising receiving the dual frequency carrier signals simultaneously through the plurality of outlets in the image reject mixer.

13. The method of claim 1, wherein the image reject mixer includes a plurality of outlets adapted to be connected therein, and is adapted to switch between the dual frequency carrier signals through one of the plurality of outputs, further comprising switching between the dual frequency carrier signals through one of the plurality of outputs in the image reject mixer.

* * * * *